US007412199B2

(12) United States Patent
Wang et al.

(10) Patent No.: US 7,412,199 B2
(45) Date of Patent: Aug. 12, 2008

(54) IMAGE SCANNER HAVING PIVOTAL ILLUMINANTOR PLATE

(75) Inventors: Chung-Kai Wang, Taipei (TW); Chien-Kuo Kuan, Taipei (TW); Wei-Chen Tu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 296 days.

(21) Appl. No.: 11/408,150

(22) Filed: Apr. 20, 2006

(65) Prior Publication Data

US 2007/0172276 A1 Jul. 26, 2007

(30) Foreign Application Priority Data

Jan. 20, 2006 (TW) .............................. 95102169 A

(51) Int. Cl.
*G03G 15/00* (2006.01)
*H04N 1/04* (2006.01)

(52) U.S. Cl. ....................... 399/367; 358/475; 358/487; 358/496; 358/506; 358/509; 358/474

(58) Field of Classification Search ................. 399/367; 358/487, 496, 474, 475, 506, 509
See application file for complete search history.

(56) References Cited

U.S. PATENT DOCUMENTS

| | | | | |
|---|---|---|---|---|
| 5,220,393 | A * | 6/1993 | Otomo | 399/125 |
| 6,324,362 | B1 * | 11/2001 | Yokoyama et al. | 399/107 |
| 7,034,967 | B2 * | 4/2006 | Ochi et al. | 358/487 |
| 7,317,560 | B2 * | 1/2008 | Nishinohara et al. | 358/487 |

* cited by examiner

*Primary Examiner*—Ren Yan
*Assistant Examiner*—Allister Primo
(74) *Attorney, Agent, or Firm*—Apex Juris, pllc; Tracy M Heims

(57) ABSTRACT

An image scanner has a pivotal illuminator plate. The illuminator plate is pivotally coupled to the main housing of the image scanner and storable within the automatic paper feeder when the illuminator plate is not used. For scanning a transparent object, the illuminator plate is rotated in the direction toward the glass platform, so that the transparent object is covered by the illuminator plate.

4 Claims, 4 Drawing Sheets

IMAGE SCANNER HAVING PIVOTAL ILLUMINANTOR PLATE

FIELD OF THE INVENTION

The present invention relates to an image scanner having an illuminator plate, and more particularly to an image scanner having an illuminator plate pivotally coupled to the main housing thereof and storable within the upper cover thereof.

BACKGROUND OF THE INVENTION

Image scanners are commonly used in offices or homes for scanning objects such as documents or photographs and processing the image of the objects into digital forms.

In addition to the function of scanning the documents or photographs, the functions of scanning slides and films become necessary.

The light source required for scanning the regular documents is positioned at the same side as the optical scanning module which is in the lower housing of the scanner. Whereas, for a purpose of scanning the slides and films, an upper light source is necessary.

In order to scan the opaque objects such as paper sheets, documents or photographs, the scanner should be operated in a reflective mode. In the reflective mode, the light emitted by the light source positioned at the same side as the optical scanning module and in the lower housing of the scanner is projected onto the surface of the opaque object. The light reflected from the opaque object is then transmitted into an image sensor of the optical scanning module. Whereas, for scanning the transparent objects such as slides or films, the scanner should be operated in a transmissive mode. Since the light emitted by the light source in the lower housing of the scanner fails to be reflected from the transparent object to the optical scanning module, the light emitted by the upper light source positioned at opposite side to the optical scanning module penetrates through the transparent object to be scanned, and then received by the image sensor of the optical scanning module.

In a case that the functions of scanning both opaque and transparent objects are provided, the scanner has a separate illuminator plate. When the scanner is operated in the reflective mode, the illuminator plate is detached from the scanner because the illuminator plate is not required at that moment. Whereas, when the scanner is operated in the transmissive mode, the illuminator plate is coupled to the scanner at the position where the upper cover is previously coupled.

Since the illuminator plate is an additional accessory of the scanner, the illuminator plate is detached from the scanner in most situations. In other words, if the illuminator plate and the scanner are separately stored, the probability of losing the illuminator plate is increased. Under this circumstance, the scanner fails to be operated in the transmissive mode.

For solving these problems, a transmissive scanner is disclosed in U.S. Pat. No. 6,417,937, which is referred hereinafter as '937 patent.

Referring to FIG. 1, a schematic view of the transmissive scanner described in the '937 patent is illustrated. The scanner 100 of the '937 patent has an automatic paper feeder 240. Specially, an upper light source 250 is disposed within the automatic paper feeder 240. Since the upper light source 250 is combined with the automatic paper feeder 240, the upper light source can be employed whenever the scanner is operated in the transmissive mode.

This '937 patent, however, still has some drawbacks. For example, the transmissive scanner has a holder for supporting the slides or films in position. Generally, the holder is arranged in the vicinity of the upper light source. As is described in the '937 patent, the holder is disposed on the automatic paper feeder 240. For scanning the slides or films, the automatic paper feeder 240 should be lifted up, the slides or films are then supported on the holder of the automatic paper feeder 240, and afterwards the automatic paper feeder 240 are placed on a glass platform. Since the automatic paper feeder is weighty, it is troublesome and labored to repeatedly uplift/lay down the automatic paper feeder to scan the transparent objects.

Furthermore, for uplifting the automatic paper feeder, the automatic paper feeder is pivotally mounted onto the main body of the scanner via a pivotal structure. Since this pivotal structure is larger than that in a situation when no automatic paper feeder is used, the gap between the automatic paper feeder and the glass platform is increased when the glass platform is covered by the automatic paper feeder. If the gap is greater than the depth of field of the image sensor, the image quality is impaired.

In views of the above-described disadvantages resulted from the prior art, the applicant keeps on carving unflaggingly to develop an image scanner having an illuminator plate according to the present invention through wholehearted experience and research.

SUMMARY OF THE INVENTION

In accordance to an aspect of the present invention, there is provided an image scanner. The image scanner comprises a main housing, a glass platform, an automatic paper feeder and an illuminator plate. The glass platform is used for placing thereon an object to be scanned. The automatic paper feeder is pivotally coupled to the main housing and has a receptacle facing to a surface of the glass platform. The illuminator plate is pivotally coupled to the main housing and has a light source thereon. The light source is storable within the receptacle when the illuminator plate is covered by the automatic paper feeder.

In an embodiment, the image scanner further comprises two slots and two pivotal sheets. These two slots are linearly arranged on the main housing. The two pivotal sheets are arranged on an edge of the illuminator plate and corresponding to the slots, wherein the pivotal sheets are inserted into corresponding slots such that the illuminator plate pivotally coupled to the main housing.

In an embodiment, the light source is a back light module to emit a light required for scanning a transparent object.

In an embodiment, the image scanner further comprises a white reflective plate disposed on a surface of the illuminator plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
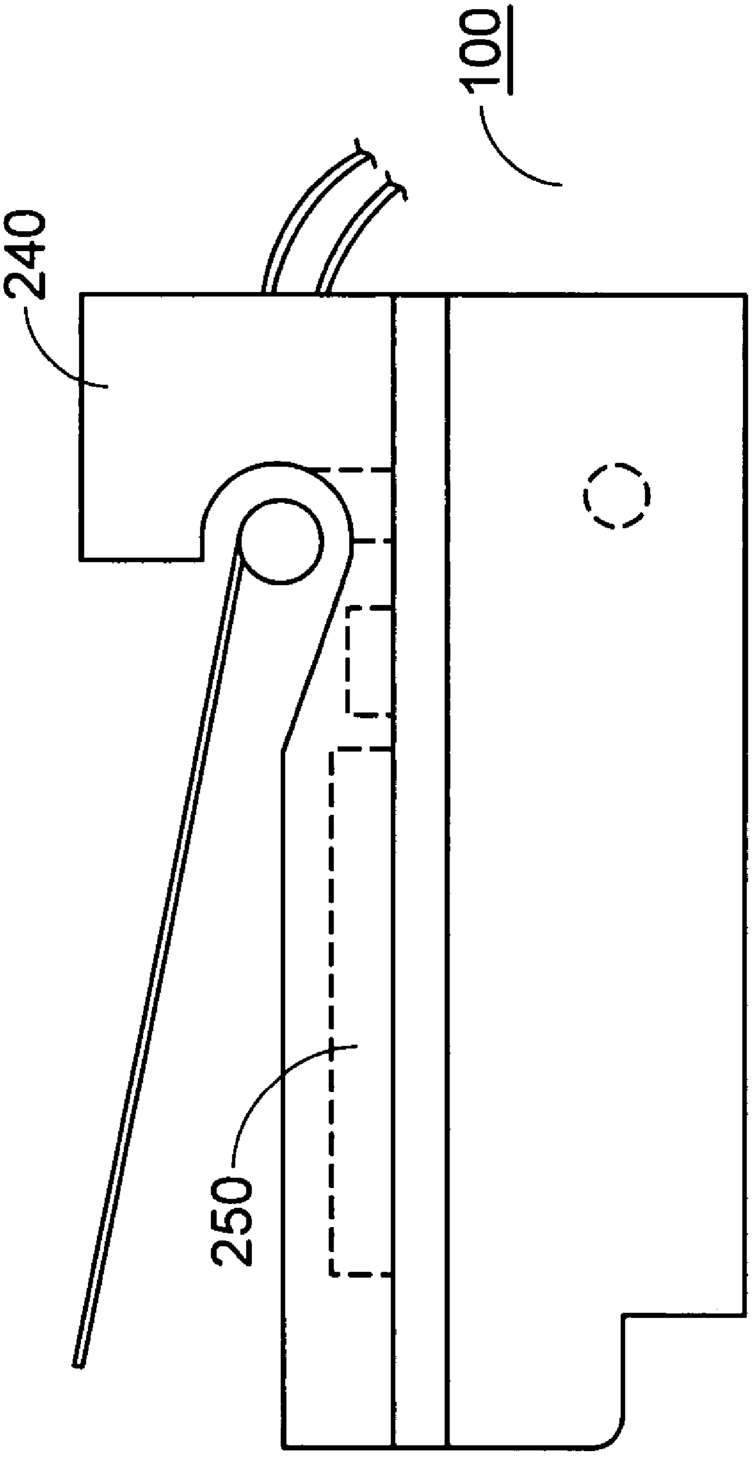
Fig.1 PRIOR ART
FIG. 1 is a schematic view of an image scanner having an upper light source arranged on an automatic paper feeder according to prior art.
Figure 2:
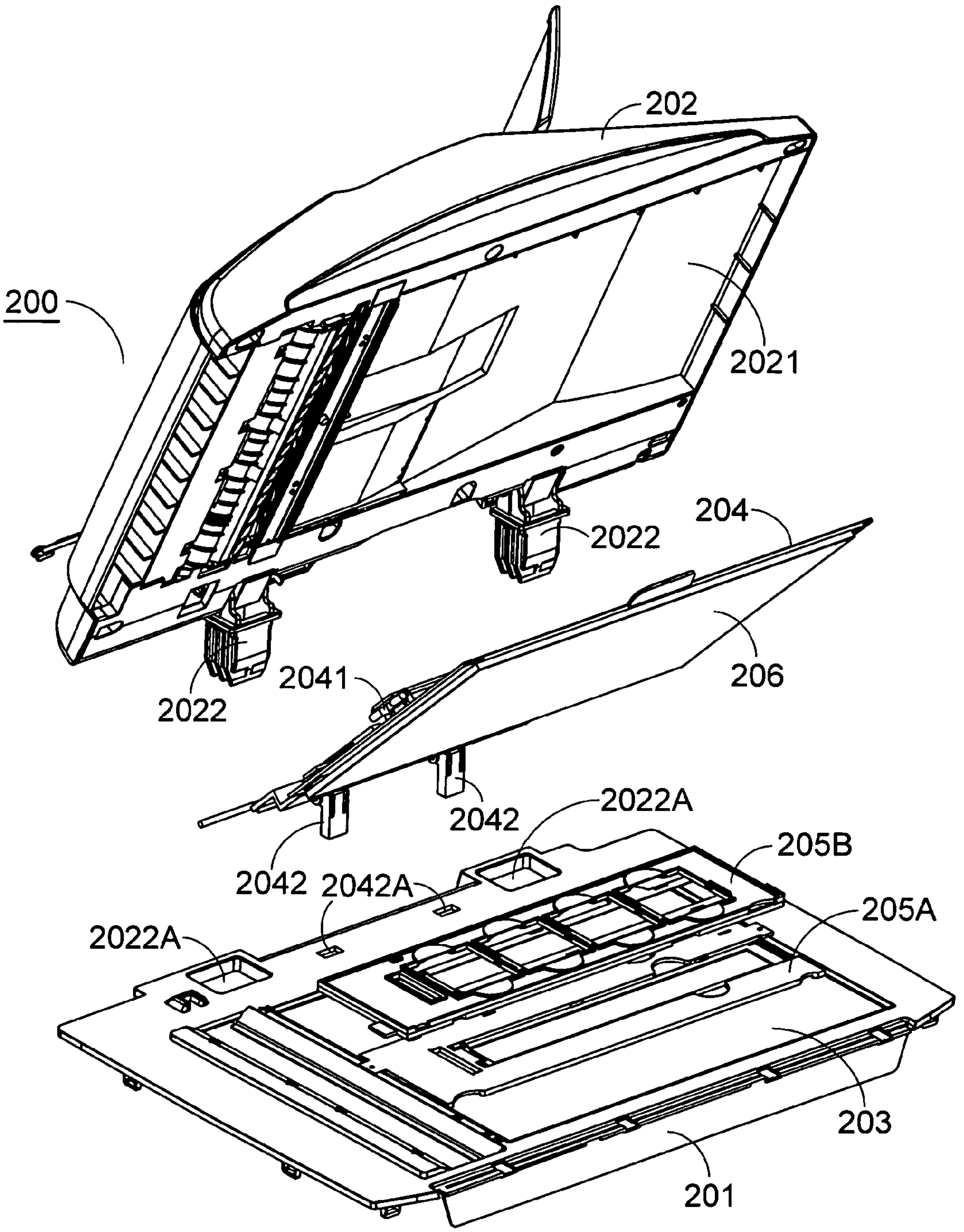
FIG. 2 is a schematic exploded view illustrating an image scanner according to a preferred embodiment of the present invention.

Referring to FIG. 2, a schematic exploded view of an image scanner according to a preferred embodiment of the present invention is illustrated. The image scanner 200 of FIG. 2 principally comprises a main housing 201, an automatic paper feeder 202, a glass platform 203, an illuminator plate 204 and a white reflective plate 206. In this embodiment, the illuminator plate 204 is pivotally coupled to the housing 201 and storable within the automatic paper feeder 202. The automatic paper feeder 202 has a receptacle 2021 facing to the surface of the glass platform 203. The illuminator plate 204 has a light source 2041 thereon.

The automatic paper feeder 202 has two pivotal structures 2022. The main housing 201 has two slots 2022A corresponding to the two pivotal structures 2022. After the pivotal structures 2022 are inserted into the corresponding slots 2022A, the automatic paper feeder 202 is pivotally coupled to the main housing 201.

The illuminator plate 204 has two pivotal sheets 2042. The main housing 201 has two slots 2024A corresponding to the pivotal sheets 2042. After the pivotal sheets 2042 are inserted into the corresponding slots 2024A, the illuminator plate 204 is pivotally coupled to the main housing 201.

The image scanner of FIG. 2 further comprises holders 205A and 205B for supporting transparent objects. The holders 205A and 205B are used for supporting films and slides, respectively.

Figure 3:
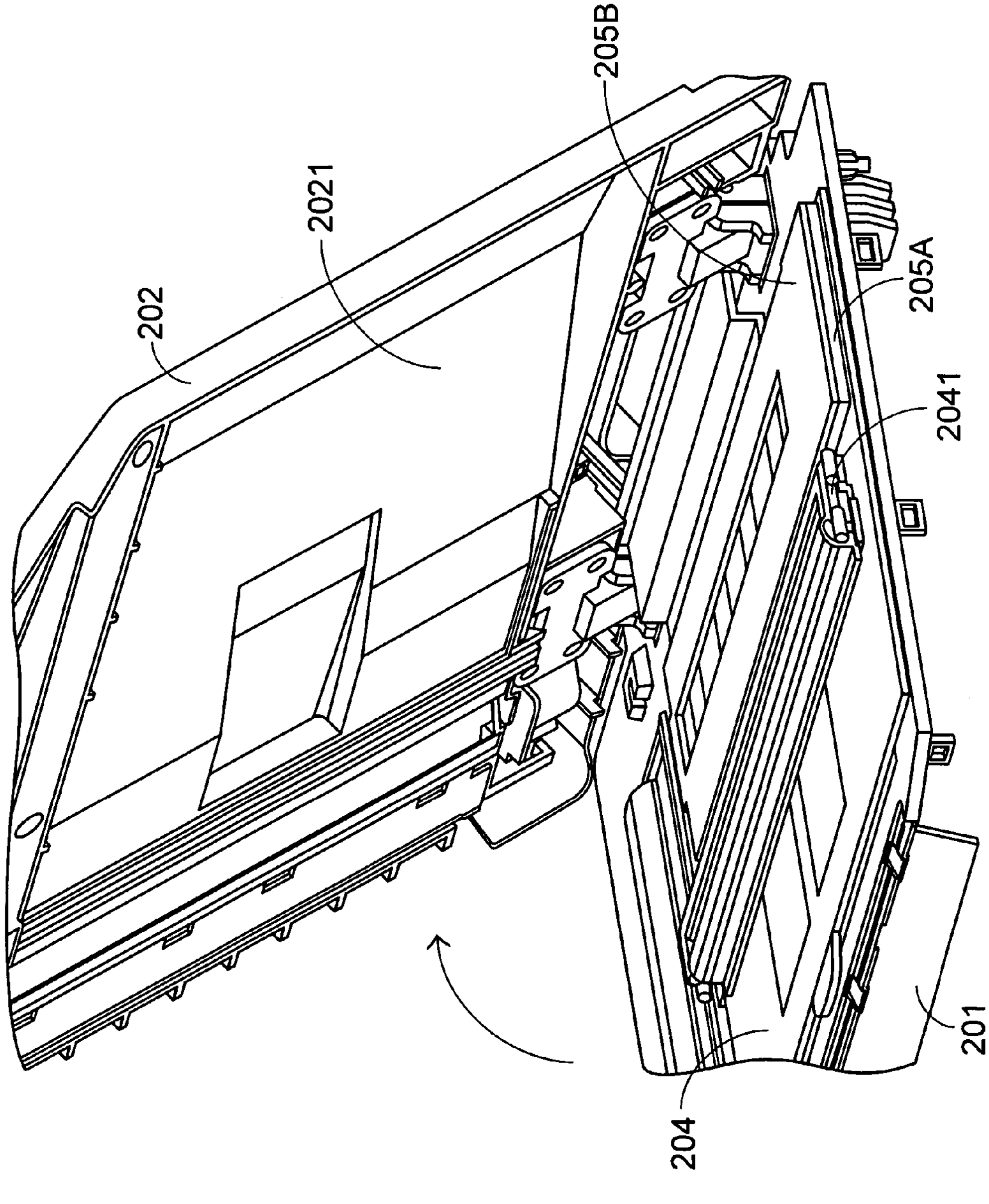
FIG. 3 is a schematic assembled view of the image scanner, in which the illuminator plate is stored within the receptacle of the automatic paper feeder.

Referring to FIG. 3, a schematic assembled view of the image scanner is illustrated. In a case that no transparent object is scanned, the holders 205A and 205B are placed on the illuminator plate 204. The illuminator plate 204 can be rotated in the direction toward the automatic paper feeder 202, so that the light source 2041 of the illuminator plate 204 is stored within the receptacle 2021 of the automatic paper feeder 202.

Figure 4:
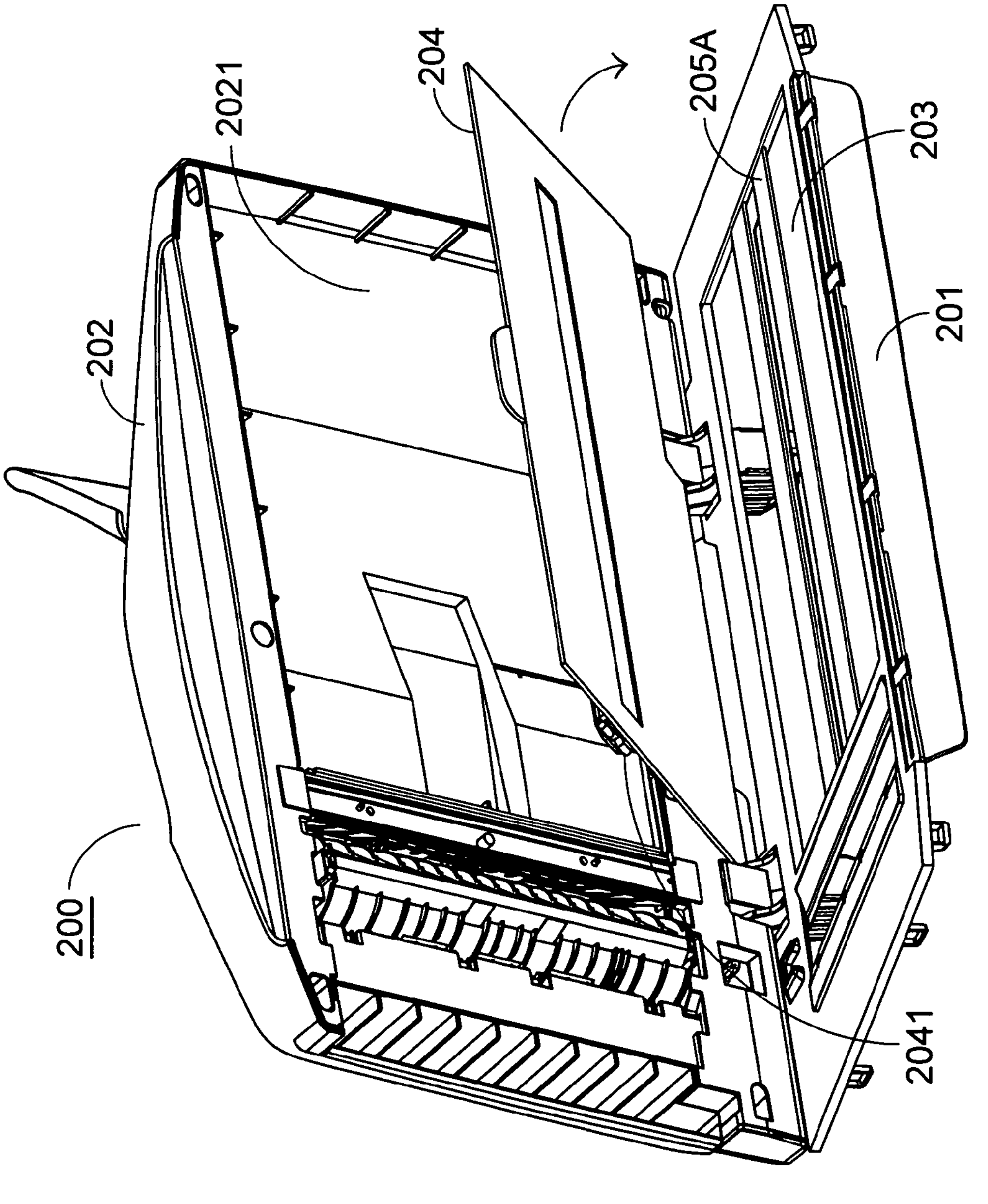
FIG. 4 is a schematic assembled view of the image scanner for scanning a transparent object.

Please refer to FIG. 4. For scanning a transparent object such a film, the film is supported by the holder 205A, and then the combination of the film and the holder 205A is placed on the glass platform 203. When the scanner 200 is operated in the transmissive mode, the white reflective plate 206 as shown in FIG. 2 is removed. The illuminator plate 204 is detached from the automatic paper feeder 202 and then rotated in the direction toward the glass platform 203, so that the glass platform 203 is covered by the illuminator plate 204. Under this circumstance, the light emitted by the light source 2041 can penetrate through the glass platform 203 for performing scanning operation.

From the above description, the illuminator plate of the scanner is pivotally coupled to the main housing and storable within the receptacle of the automatic paper feeder. Since the illuminator plate is storable within the automatic paper feeder, the problem of losing the illuminator plate is avoided. Furthermore, the automatic paper feeder can be separated from the illuminator plate but only the illuminator plate is placed on the glass platform when the transparent objects are scanned. Accordingly, the glass platform needs not support the weight of the whole automatic paper feeder when the transparent objects are scanned. Since the illuminator plate is relative light in weightiness, the pivotal sheets of the illuminator plate are smaller than the pivotal structure of the conventional automatic paper feeder. Under this circumstance, the gap between the automatic paper feeder and the glass platform is reduced when the glass platform is covered by the automatic paper feeder. Therefore, the depth of field of the image sensor is acceptable without impairing the image quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner comprising:

a main housing;

a glass platform for placing thereon an object to be scanned;

an automatic paper feeder pivotally coupled to said main housing and having a receptacle facing to a surface of said glass platform; and an illuminator plate pivotally coupled to said main housing and having a light source thereon, wherein said light source is storable within said receptacle when said illuminator plate is covered by said automatic paper feeder.

2. The image scanner according to claim 1 further comprising:

two slots linearly arranged on said main housing; and two pivotal sheets arranged on an edge of said illuminator plate and corresponding to said slots, wherein said pivotal sheets are inserted into corresponding slots such that said illuminator plate pivotally coupled to said main housing.

3. The image scanner according to claim 2 wherein said light source is a back light module to emit a light required for scanning a transparent object.

4. The image scanner according to claim 2 further comprising a white reflective plate disposed on a surface of said illuminator plate.

* * * * *